No. 745,226. PATENTED NOV. 24, 1903.
L. MOTT.
CONTROLLER FOR AUTOMOBILES.
APPLICATION FILED DEC. 26, 1902.
NO MODEL.

Witnesses:   Inventor:
Laurence Mott

No. 745,226. Patented November 24, 1903.

UNITED STATES PATENT OFFICE.

LAURENCE MOTT, OF NEW YORK, N. Y.

CONTROLLER FOR AUTOMOBILES.

SPECIFICATION forming part of Letters Patent No. 745,226, dated November 24, 1903.

Application filed December 26, 1902. Serial No. 136,538. (No model.)

*To all whom it may concern:*

Be it known that I, LAURENCE MOTT, of New York, in the county of New York and State of New York, have invented certain new and useful Improvements in Controllers for Automobiles, of which the following is a specification.

This invention relates to devices for controlling throttles and other or similar parts of the motive mechanism for automobiles; and its object is to so mount said controlling devices as to make them easy of access to the operator and steersman, yet capable of being displaced, so as to be operated from different positions and give easy access to and from the operator's seat. To this end in the preferred embodiment which I have illustrated in the accompanying drawings I provide the throttle connections near the point where they proceed to the operator's handle with a universal joint, enabling such connections to be operated in different angular positions or thrown away from the vehicle-seat, and I also mount such connections alongside of and support them by the upper part of the steering connection, which is similarly mounted for universal movement, as described in my copending application, Serial No. 132,576. It will be understood that this idea of a universal swinging movement also includes the idea of a simple swinging movement toward and from the seat.

Figure 1:
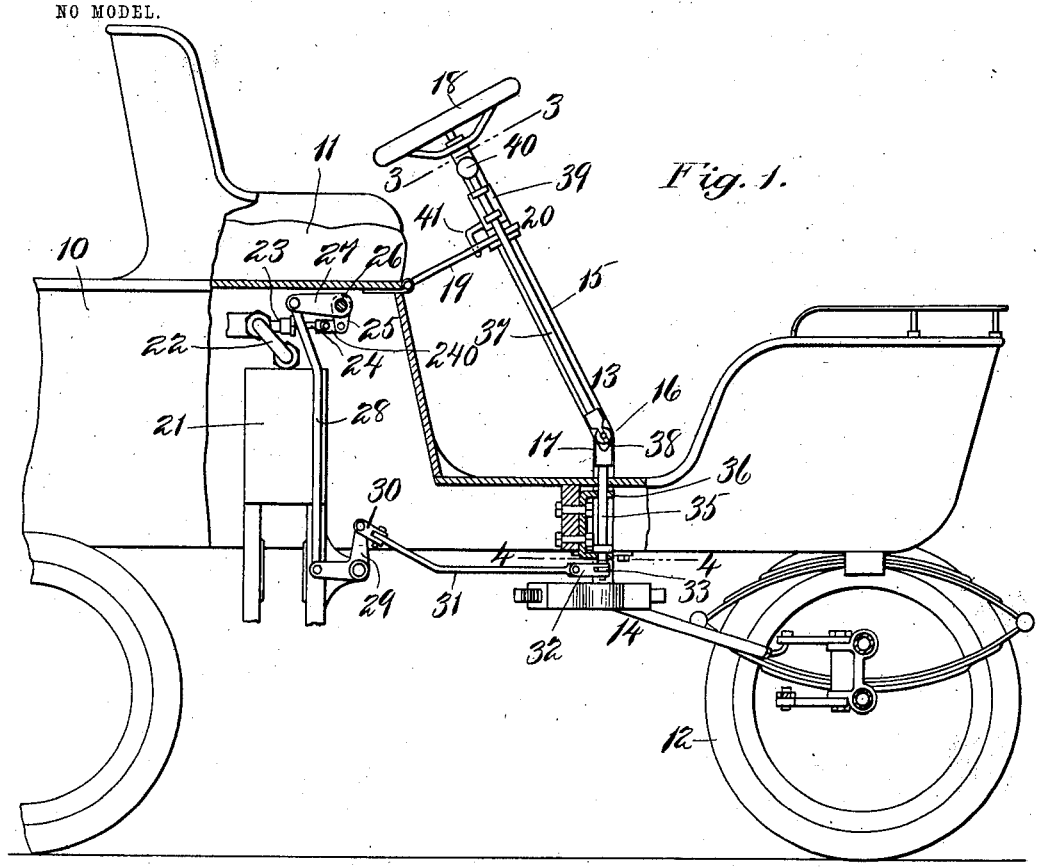
Figures 2, 3, 4:
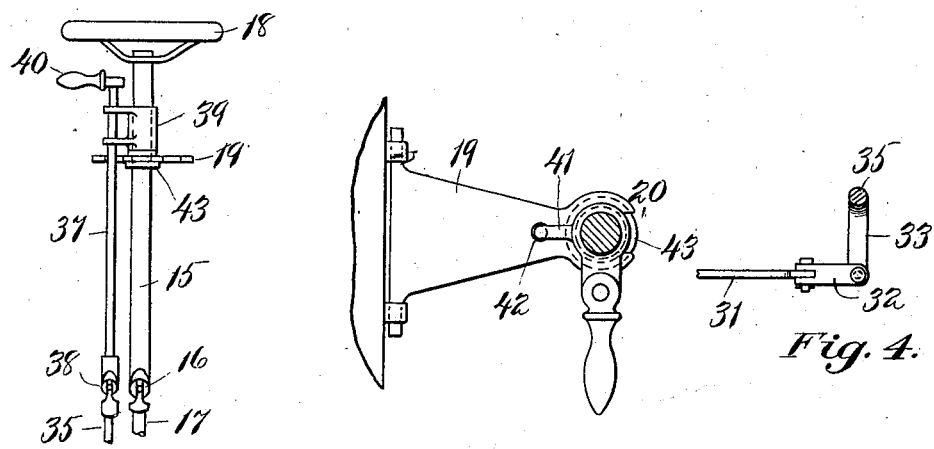

Of the accompanying drawings, Figure 1 represents a view in side elevation and section showing an automobile provided with a controller embodying my invention. Fig. 2 represents a front elevation showing the swinging part of the steering and throttle connections. Figs. 3 and 4 represent sectional views on lines 3 3 and 4 4, respectively, of Fig. 1.

The same reference characters indicate the same parts in all the figures.

In the drawings, 10 indicates the vehicle-body, having a seat 11, and 12 indicates one of the steering-wheels.

13 is a steering member having a lower vertical section 17, journaled in a bearing on the floor of the vehicle and having steering connections 14 below the body with the steering-wheel 12, said member having an upper section or pillar 15, connected by a universal joint 16 with the section 17 and having a steering-wheel 18 at its upper end, whereby the pillar may be rotated and the wheels turned, the said swinging section 15 being supported in its normal inclined position within reach of the operator or steersman by means of a hinged bracket 19, attached to the pillar 15 by a coupling 20, which is connected and disconnected by a vertical swinging movement of the bracket, all as more fully described in my said application, the effect of this construction being that when the pillar 15 is disconnected from bracket 19 the said pillar may be swung away from the operator's seat to enable him to enter and leave said seat easily, or may be swung to either side or forwardly to enable steering to be performed from another part of the vehicle or by a person walking alongside of the vehicle.

21 represents the cylinder of the steam-engine or motor for driving the vehicle, and 22 represents the steam-supply pipe therefor, having the usual throttle-valve mechanism 23. Connections extend from said throttle through a valve-rod 24, link 240, rock-arm 25, rock-shaft 26, rock-arm 27, link 28, bell-crank lever 29, and links 30 31 32 to an arm 33, formed on the lower end of a shaft 35, which is journaled in a bracket 36 on the vehicle-floor alongside of and parallel to the steering-pillar section 17.

37 is a pillar rod or shaft having connection by a universal joint 38 with the upper end of shaft 35, which joint is horizontally opposite the universal joint 16 in the steering-pillar. The rod 37 extends along parallel to the swinging pillar 15, and has a bearing near its upper end in a bearing-sleeve 39, which loosely surrounds the pillar 15. At the upper end of the rod 37 is a handle 40, projecting at right angles thereto and located in a convenient position just below the steering-wheel 18 for rotating said rod. The bearing 39 is held from rotation by means of an L-shaped projection or finger 41, cast thereon and entering a hole 42 in the bracket 19. The downward movement of the sleeve 39 along pillar 15 is limited by a collar 43, fixed on said pillar and forming one member of the coupling 20.

It is evident that when the rod 37 is rotated by means of its handle 40 the shaft 35 will also be rotated through the universal joint 38, and through the described connections will reciprocate the throttle-rod 24 and operate the throttle-valve mechanism 23, thereby admitting steam to or shutting it off from the steam-chest of the engine-cylinder 21. As the rod 37 is supported by the steering-pillar 15 said rod will be carried with said pillar in the different directions in which the latter is swung, thus enabling the operator to easily enter or leave his seat or to operate the throttle devices, as well as the steering devices, from other than their normal positions. When the steering-pillar is swung crosswise of the carriage, there is a relative longitudinal movement of the pillar 15 and rod 37, owing to the fact that the two swing on noncoincident centers at the joints 16 38, and such relative movement is permitted by allowing the rod 37 a sliding movement on its bearing-sleeve 39. Said sleeve is also permitted to move upwardly on the pillar 15 for the purpose of disengaging its lug 41 from the bracket 19 and permitting said bracket to be uncoupled from the collar 43 for the purpose of releasing the pillar from its support.

Although I have described my invention as applied to the throttle of a steam-engine, it might obviously be applied to other controlling parts of a motor.

I claim—

1. In a controller for automobiles, the combination of a plurality of controlling-pillars operating by rotary or twisting movements about their longitudinal axes and having in addition swinging or pivotal movements, said pillars being connected to swing in common, and vehicle-controlling devices operated by the rotary movements of the respective pillars.

2. In a controller for automobiles, the combination of two controlling-pillars operating by rotary or twisting movements about their longitudinal axes and having in addition swinging or pivotal movements, said pillars being connected to swing in common, a vehicle-steering mechanism controlled by one of said pillars, and a vehicle-propelling mechanism controlled by the other pillar.

3. In a controller for automobiles, the combination of a vehicle-body having a seat, a plurality of pillars mounted in front of said seat and connected to swing together toward and from said seat for the purpose specified, said pillars also having rotary or twisting movements about their longitudinal axes, and vehicle-controlling devices operated by the rotary movements of said pillars.

4. In a controller for automobiles, the combination of two pillars mounted externally to each other and each having a rotary or twisting movement and a swinging or pivotal movement, said pillars being connected to swing in common, vehicle-controlling devices operated by the respective pillars, and universal joints at the centers of swinging movement for transmitting the rotary movements of said pillars to said devices.

5. In a controller for automobiles, the combination of a steering-pillar having a rotary or twisting operating movement about its longitudinal axis and also a swinging or pivotal adjusting movement, vehicle-steering connections operated by said rotary movement, a controlling device connected to swing with said pillar and having its operating movement independent of said swinging movement, and vehicle-controlling mechanism operated by said device.

6. In a controller for automobiles, the combination of a rotary steering device mounted for universal swinging movement, motor-controlling mechanism, and an operating device for said mechanism supported by said steering device and mounted for universal swinging movement.

7. In a controller for automobiles, the combination of a steering-pillar and a motor-controlling rod mounted for universal swinging movement on different centers, and a sliding connection between said members.

8. In a controller for automobiles, the combination of a steering-pillar and a motor-controlling rod mounted for universal swinging movement, and means to support said members against such movement.

9. In a controller for automobiles, the combination of a steering-pillar and a motor-controlling rod mounted for universal swinging movement, a bracket supporting said pillar and having a separable connection therewith, and a bearing on said pillar having a longitudinal sliding connection therewith and with said rod and having a separable connection with said bracket for preventing the rotation of said bearing.

In testimony whereof I have affixed my signature in presence of two witnesses.

LAURENCE MOTT.

Witnesses:
R. M. PIERSON,
ADELINE C. RATIGAN.